March 14, 1939.　　　　B. FRANGHIA　　　　2,150,890
APPARATUS FOR WORKING SHEET MATERIAL
Filed May 6, 1935　　　3 Sheets-Sheet 1
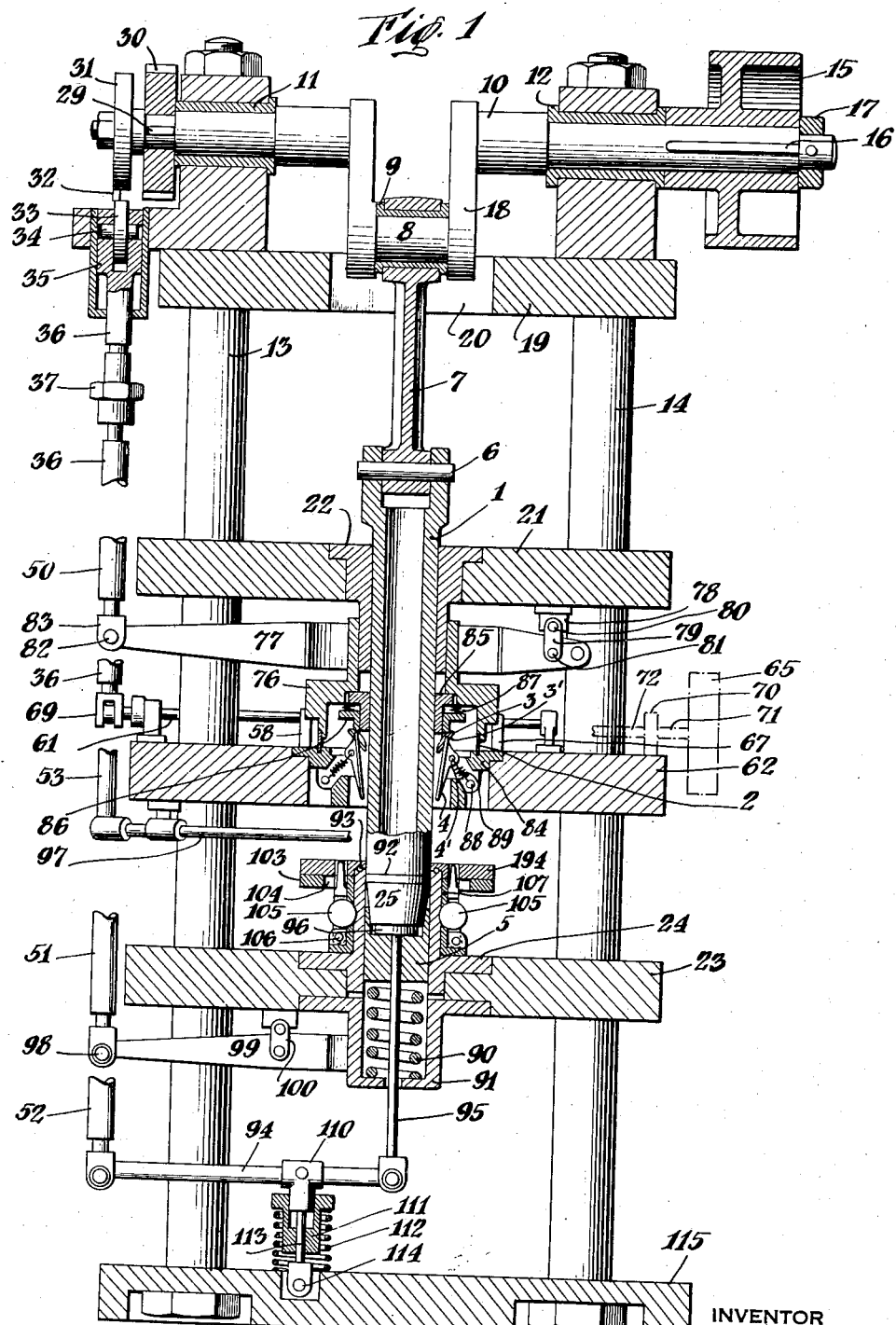
INVENTOR
Byron Franghia
BY
Hoguet, Neary & Campbell
ATTORNEYS

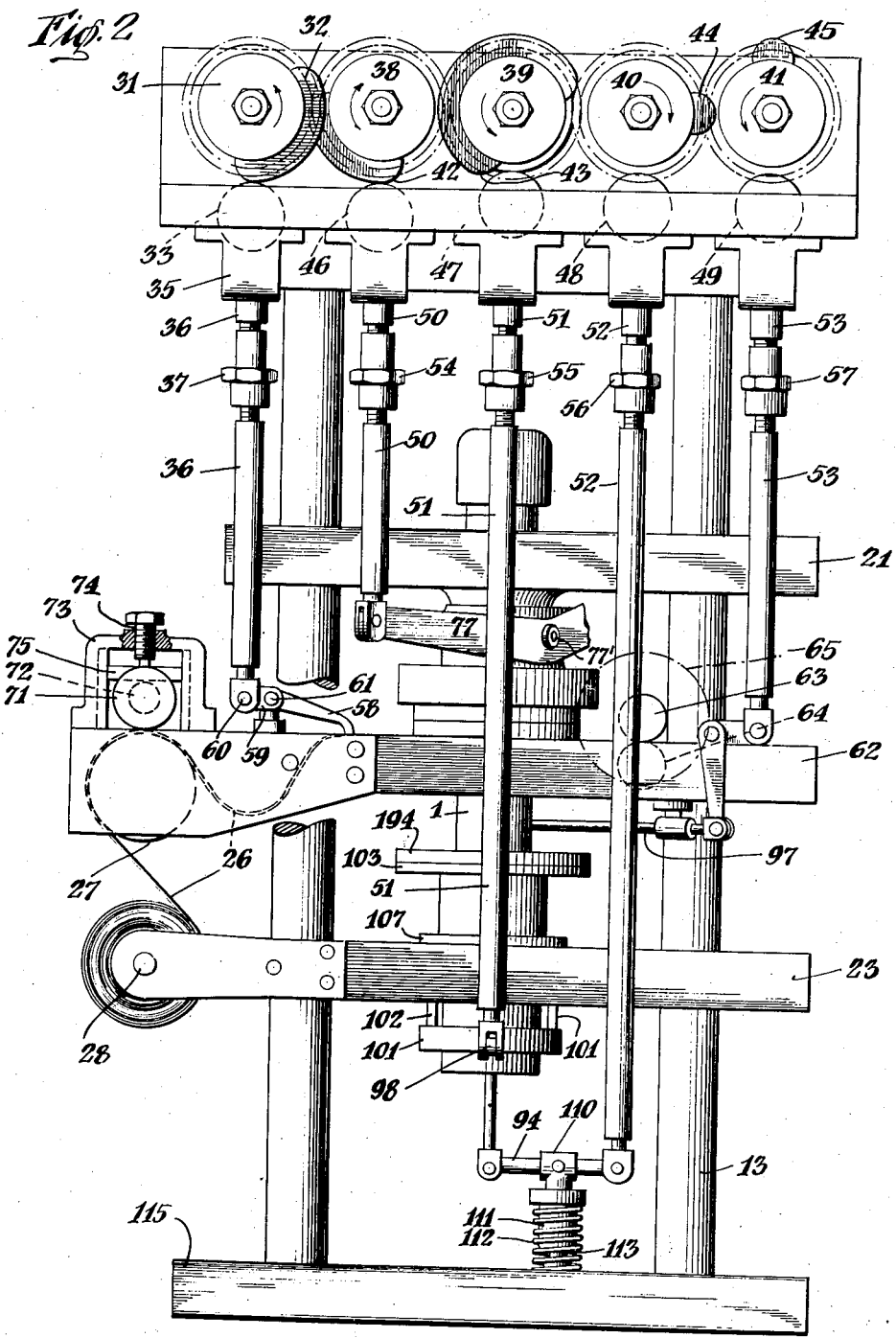

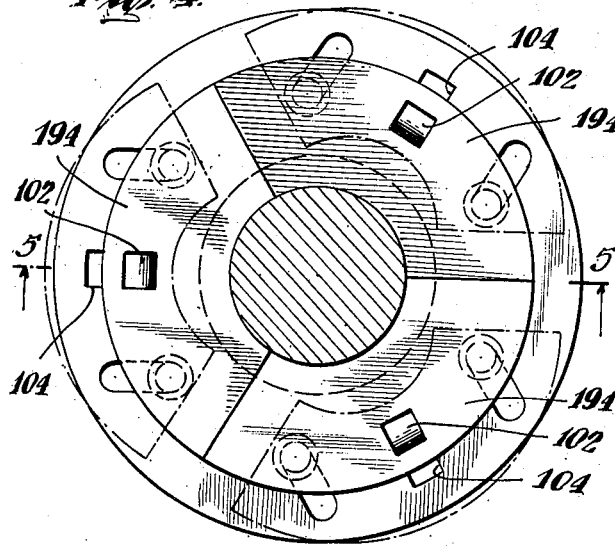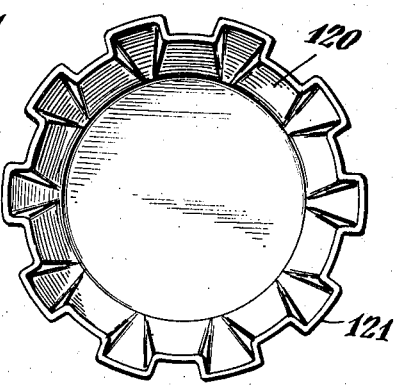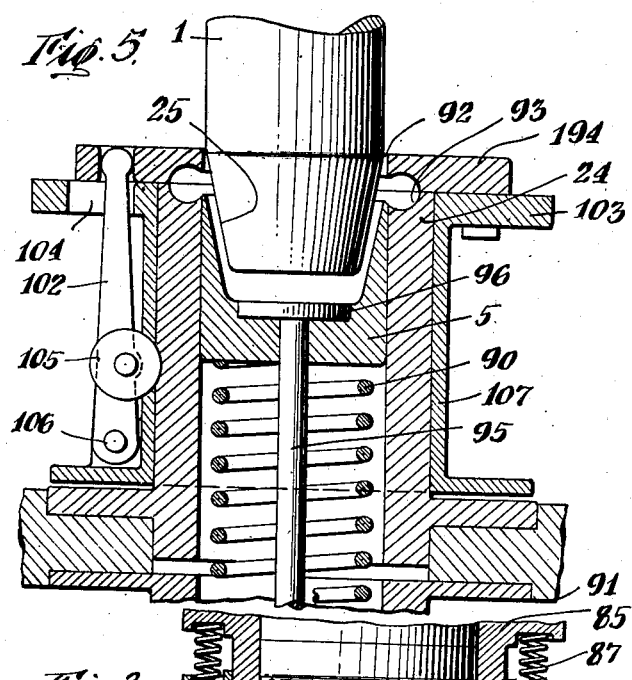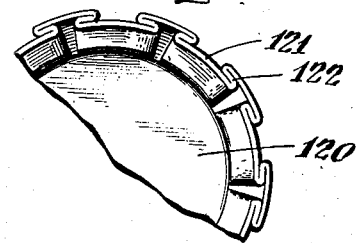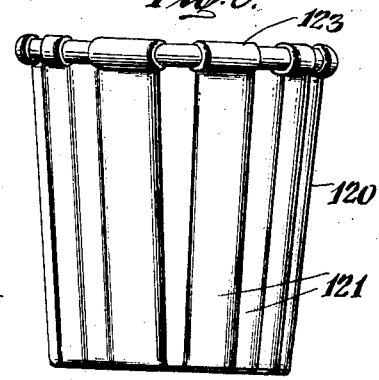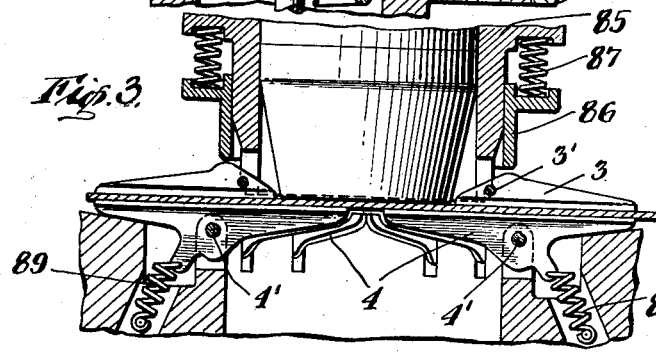

Patented Mar. 14, 1939

2,150,890

UNITED STATES PATENT OFFICE 2,150,890

APPARATUS FOR WORKING SHEET MATERIAL

Byron Franghia, Paris, France, assignor to British Hygienic Containers Limited, London, England Application May 6, 1935, Serial No. 20,045
In Germany July 19, 1934

3 Claims. (Cl. 113—42)

This invention relates to an improved apparatus for manufacturing articles out of thin sheet material.

In the manufacture of articles of sheet material of various forms, several types of operation must be successively employed before the completion of the work, such as cutting, stamping, crinkling, etc. in a desired order. Such a process of manufacture usually entails the use of a plurality of complex machines to each of which the work is transferred for a particular operation. Whatever may be the number or nature of the necessary operations and the order in which they should be carried out to obtain a favorable result, it is advantageous to complete the manufacture of the articles in a minimum time by means of a higher rate of speed in operation of the machine.

It is therefore an object of this invention to provide a machine capable of completing all of the necessary work to the elimination of the necessity for supplementary hand work.

It is also an object to provide such a machine in the form of a self-contained unit for successively carrying out the various operations in the desired order.

It is a further object to provide such a machine that necessitates but a single plane of work so that upon the movement of one member in that plane for performing one operation, the remaining members operate in a predetermined order for completing the other operations, such as cutting, corrugating and beading at different levels and in the desired order.

With the foregoing and other objects in view, the invention resides in the combination of parts and in the details of construction hereinafter set forth in the following specification and appended claims, certain embodiments being illustrated in the accompanying drawings, in which—

Figure 1 is a view in elevation, partly in section of the machine;

Figure 2 is a view in elevation of the machine, taken at right angles to Figure 1;

Figure 3 is a view in vertical section of a typical form of corrugating device;

Figure 4 is a plan view of the bead forming device with the stamping punch shown in section;

Figure 5 is a view in section taken on line 5—5 of Figure 4;

Figure 6 is a plan view of a partially formed cup;

Figure 7 is a plan view of a cup with the corrugations flattened to form pleats; and, Figure 8 is a side view of the completed cup.

Referring more particularly to the drawings, the invention has to do with a machine that necessitates but a single plane of work, as for example, the vertical plane. Thus during the descent of the stamping punch 1, all of the operations necessary for the completion of the manufactured article may be carried out successively and continuously in the desired order in a vertical plane. The intervening elements, such as the cutting knife 2, the pawls 3 and 4 for crinkling the material, the members for the beading operation and a matrix 5 are all arranged at different vertical levels in a desired order and concentrically with respect to the longitudinal axis of the stamping punch. Thus on a single descent of the stamping punch a blank of sheet metal, such as iron, is cut, crinkled, stamped, beaded and completely finished and discharged without resorting to other machines and without other operations than those included in the different stages of operation of the one unitary machine.

The stamping punch may be hollow as shown in Figure 1. It is connected by a pin 6 to a connecting rod 7 engaging a crank pin 8 with an intervening bearing 9. The crank is an integral part of the shaft 10 suported in bearings 11 and 12 by the upright posts 13 and 14. The shaft may be provided with a belt pulley 15 keyed thereto at 16 and held in position longitudinally by a nut 17. The belt pulley may be rotated by a belt from a suitable source of power. The rotation of shaft 16 thus reciprocates the stamping punch, and the frequency of these reciprocations and the length thereof is dependent upon the length of the throw 18 between the shaft 19 and the crank pin 8. The platform 19, supported by the uprights is cut out at 20 to permit the necessary movement of the connecting rod 7 and the crank pin 8 and throw 18.

Fixed to a second and lower platform 21 is a sleeve 22 for aligning and centering the stamping punch as it reciprocates therethrough. As a further centering means the platform 23, also supported by the uprights, is provided with a fixed sleeve 24 for receiving the stamping punch. The lower extremity, shown at 25 in the form of a truncated cone, may be of any appropriate form for the desired part.

The movement of the stamping punch, the knife 2, the stopping of the band of sheet iron for cutting, the operation of suitable members for the beading of the sheet iron pieces, and the continuous unrolling of the band of sheet iron and the discharge of the finished pieces may be correlated by means of appropriate cams, levers and connecting rods. For instance the shaft 10 has keyed thereto at 29 a gear 30 which, in turn, drives a cam wheel 31 provided with a cam 32. This cam wheel and cam bear against a roller 33 on a pin 34 in a block 35 integral with a rod 36. Rod 36 is divided and provided with an adjustment nut 37 to vary its effective length. Gear 30 drives a train of adjacent gears for correspondingly driving a series of cam wheels 38, 39, 40 and 41 and their respective cams 42, 43, 44 and 45 in the respective directions shown by the arrows in Figure 2. These cams likewise bear respectively on rollers 46, 47, 48 and 49 to operate rods 50, 51, 52 and 53, these rods being also provided with adjustment nuts 54, 55, 56 and 57.

The band of sheet iron 26 in which are cut out the blanks to be worked is rolled upon a drum 27 which turns with a continuous movement. The storage drum from which the sheet iron is drawn rotates about an axis 28. The sheet iron is drawn by its free extremity but must be stopped during the time necessary for the cutting.

This may be done by means of a gripping lever 58 operated by the lever 36 through the medium of an intermediate short lever 59 pivotally connected to lever 36 at 60 and supported pivotally at 61 and secured to the gripping lever 58. The drive during this stopping interval is thrown out of gear by an appropriate coupling gear while the drum 27 pays out the necessary length of sheet iron for the next operation.

The thin band of sheet iron moves over the platform 62, also supported by the uprights. The diameter of the drum 26 is such that the length of sheet iron, paid out during the descent of the stamping punch and its ascent, corresponds to the length of the blank cut. The band is drawn at its other extremity so as to pass between two small friction drums 63 and 64. The upper drum 63 is driven by a suitable pulley 65, which may be suitably belt driven, and the lower drum 64 is an idler drum free to rotate upon its axis. As in the moment of cutting, the band must remain stationary, there are two gripping levers 58 and 67 controlled by the shaft 61 connected to the fork 69 of the rod 36 so as to clamp the sheet iron band against movement on the platform 62. At the moment the gripping levers 58 and 67 engage the sheet band against movement and as a result thereof the drive of the band 63 is released so as to render the drawing action thereof automatically ineffective until the bars 66 and 67 are again raised. This release may be effected by any suitable clutch arrangement diagrammatically represented by the box in dotted lines at 70 through which the shafts 71 and 72 extend, the former shaft being directly driven by the drum 65. A friction drum 70 rotatable about a shaft 72 bears against the band 26 to hold the latter against the drum 27. The shaft 72 may be carried by the block 75 supported by the bolt 74 which is adjustable in the bracket 73.

The cutter head 76 carrying the cutting blade 2 is centered so as to be slidable on the sleeve 22. It is controlled by the operation of the lever 77 by means of its pivotal connection 77' to the cutter head. This lever is pivoted at 81 to a link 79 which is pivoted at 80 to a stationary bracket 78. The other end of the lever 77 is pivotally connected at 82 to a forked extension 83 of the rod 50, the operation of which controls the reciprocatory movement of the cutterhead.

At the beginning of the movement the sheet band 26 to be cut is upon the platform 62. The cutterhead is then lowered until the blade 2 engages a circular groove in the cutting block 84 as the blade passes through the metal band 26. At the same time the cone 25 of the stamping punch rests on the blank of the band 26 and begins the stamping operation. As shown in Figs. 1 and 3, the cutterhead carries a sleeve 85 by means of which the cutterhead is slidably centered on the stamping punch 1. Slidably centered and fitted about the sleeve 85 is a sleeve 86 normally urged downwardly by a compression spring 87 between adjacent flanges of the sleeves 85 and 86. The pawls 4 are pivotally secured at 4' to the casing and the pawls 3 are pivotally connected at 3' to the sleeve 85. The pivot points 3' and 4' are both excentric with respect to their respective pawls 3 and 4. A tension spring 89 anchored at 88 is connected to pawl 4 to normally urge the lower portion of pawl 4 inwardly. The downward movement of the cutterhead and the sleeves 85 and 86 overcome the action of springs 87 and 89 to move the pawls about their pivots. The sheet iron blank is caught between these two series of pawls arranged in different vertical planes to bring about the fluting or corrugating operation and to produce the partially formed cup 120 shown in Fig. 6. The cup has corrugated side walls 121 in which the corrugations taper in depth from the upper edge of the cup 120 to adjacent its base. The ring 86 resiliently presses downwardly on the upper pawls 3 to avoid possible delay and to permit regular corrugating. When the punch 1 is raised, the pawls 3 and 4 return to a horizontal plane in readiness for the next operation. A corrugating device of this type is disclosed in my Patent No. 2,040,929, dated May 19, 1936.

The sheet iron which has been stamped and corrugated is carried downwardly by the punch for the beading of the edge of the sheet iron blank in a device of the type disclosed in my co-pending application, Serial No. 20,046, filed May 6, 1935. This beading device is best shown in Figs. 4 and 5. The punch forces the corrugated blank into the matrix 5 and in its lowermost position, as shown in Figure 1, lowers the movable matrix 5 against the action of a compression spring 90 in the cup 91. The blank is thus formed into a cup with pleated walls. As shown in Fig. 7, the corrugated walls 121 of the cup 120 are flattened to form a plurality of adjacent folds or pleats 122. Displacement of the matrix 5 is regulated in such a manner that the edge 92 of the cone 25 is below the groove 93 formed jointly in the upper extremity of the collar 24 and the sectors 194, in which groove the beading takes place. The bar 52 raises the lever 94 to push the ejecting rod 95 upwardly through the matrix. Secured to the rod 95 is a plate 96 which pushes the stamped blank upwardly in a position to be pushed aside by a rod 97 actuated by the operating rod 53 so as to make room for the next complete operation on the sheet band 26.

Having more particular reference to the beading operation, the matrix or the mould is displaced in the fixed ring 24 by downward movement of punch 1. During upward movement of punch 1, the operating rod 51 is pushed downwardly by cam 43. This rod is pivoted at 98 to a lever 99 which in turn is pivoted to the platform 23 by means of a link 100. Thus a downward movement of rod 51 rotates the lever 99 counterclockwise. This causes an upward movement of the ring 107 and the levers 102 carried thereby. These levers pass through enlarged slots 104 of a plate 103 on the upper end of ring 107. The plate 194 rests on and is connected to plate 103 and is divided into sectors capable of radial movement with respect to plate 103. The levers also pass through plate 194 in relatively small slots. These levers are pivoted at 106 to the ring 107 and carry rollers 105 which are shown in Figure 1 engaging arcuate recesses in the adjacent outer face of the collar 24. An upward movement of the ring 107 moves the rollers 105 out of their recesses and the levers 102 are thus moved pivotally outwardly to spread the sectors 194 outwardly to the positions shown in dotted lines in Fig. 4. This outward movement is limited by the limited movement of the levers in the slots 104 in the stationary ring 103. When the punch 1 reaches its lowest position, the rod 51 moves upwardly as roller 47 rides off cam lobe 43, moving sleeve 107 downwardly. Rollers 105 on lever 102 enter the recesses in sleeve 24 moving sectors 194 into substantial engagement with punch 1 and aligning the grooves 93 for a beading operation. Upward movement of punch 1 allows matrix 5 to force the hollow blank or cup upwardly, thereby forcing the free edge of the cup into the groove 93 and curling or beading its edge.

When the bead is formed on the cup and during upward movement of punch 1, the rod 51 is again forced downwardly, moving sleeve 107 upwardly, spreading the sectors 194 and releasing the cup so that it may be lifted from the matrix by ejector rod 95 and disk 96. Rod 97 is then actuated to sweep the cup from the machine.

The completed cup 120 is disclosed in Fig. 8. The cup 120 has a rolled or beaded edge 123, the upper edges of pleated walls being rolled to form the bead.

To provide a pressure cushion for the lever 94 the latter may be provided with a T-sleeve 110 slidable in a pressure sleeve 111 around which is arranged a compression spring 112. A sliding rod 113 is pivotally mounted at 114 to the base 115 to ride freely within the sleeve 110.

I claim:

1. Machine for forming dished or cup-like pleated containers from thin sheet material, comprising a vertical frame, a vertical punch within the frame, a guide for said punch between the top and bottom of said frame, means at the top of said frame for reciprocating the punch, a matrix at the lower part of the frame into which the lower end of the punch is forced to effect a final cupping or shaping action on the sheet material, said matrix yieldingly opposing the downward pressure of the punch, a cutting platform between said guide and said matrix, a cutter head disposed about the punch and above said platform, means guiding the sheet material in successive stages on to said platform, means to depress the cutter head against the platform to sever the sheet material in advance of the engagement of the sheet material by the punch, and preliminary cupping or shaping means to form the severed pieces of material into pleated cup-like form before being fed into the matrix, said preliminary cupping or shaping means comprising a plurality of pawl like fingers disposed symmetrically about and substantially radiating from the axis of the path of travel of the punch, said fingers being disposed close against the base of the sheet material during the cutting stages and yieldingly opposing descent of the punch so as to pleat the severed pieces of material in cup-like form upon the lower end of the punch.

2. Machine for forming dished or cup-like pleated containers from thin sheet material, comprising a frame, a reciprocating punch in the frame, means to feed the sheet material across the axis of travel of the punch, means to sever a disc-like section from the sheet material in advance of the engagement of the punch with the sheet material, means to pleat or fold the severed portion of sheet material in dished or cup-like form snugly about the punch simultaneously with the descent of the punch through and beyond the plane of severance of the sheet material, and a matrix beyond said plane located to receive the punch and the dished or cupped piece of material thereon, said pleating or folding means comprising a plurality of elements bearing against the severed piece of material and yieldingly opposing the movement of the punch towards said matrix.

3. Machine for forming dished or cup-like pleated containers from thin sheet material, comprising a frame, a reciprocating punch in the frame, means to feed the sheet material across the axis of travel of the punch, means to sever a disc-like section from the sheet material in advance of the engagement of the punch with the sheet material, means to pleat or fold the severed portion of sheet material in dished or cup-like form snugly about the punch simultaneously with the descent of the punch through and beyond the plane of severance of the sheet material, a matrix beyond said plane located to receive the punch and the dished or cupped piece of material thereon, said pleating or folding means comprising a plurality of elements bearing against the severed piece of material and yieldingly opposing the movement of the punch towards said matrix, a driven shaft for reciprocating the punch, a beading device with the matrix comprising a unitary plate and a plurality of radially expansible segments in a plane at right angles to the axis of the punch, an extruding device with the matrix to extrude the shaped articles, a plurality of cams adapted to be driven in unison with said shaft and a corresponding number of operating rods operatively connecting said cams to the means for severing the sheet material and to said extruding device.

BYRON FRANGHIA.